Sept. 3, 1929.  R. B. OTWELL  1,726,760
COMBINED MOTOR GENERATOR STARTING UNIT FOR TRACTORS
Filed March 7, 1928    3 Sheets-Sheet 3
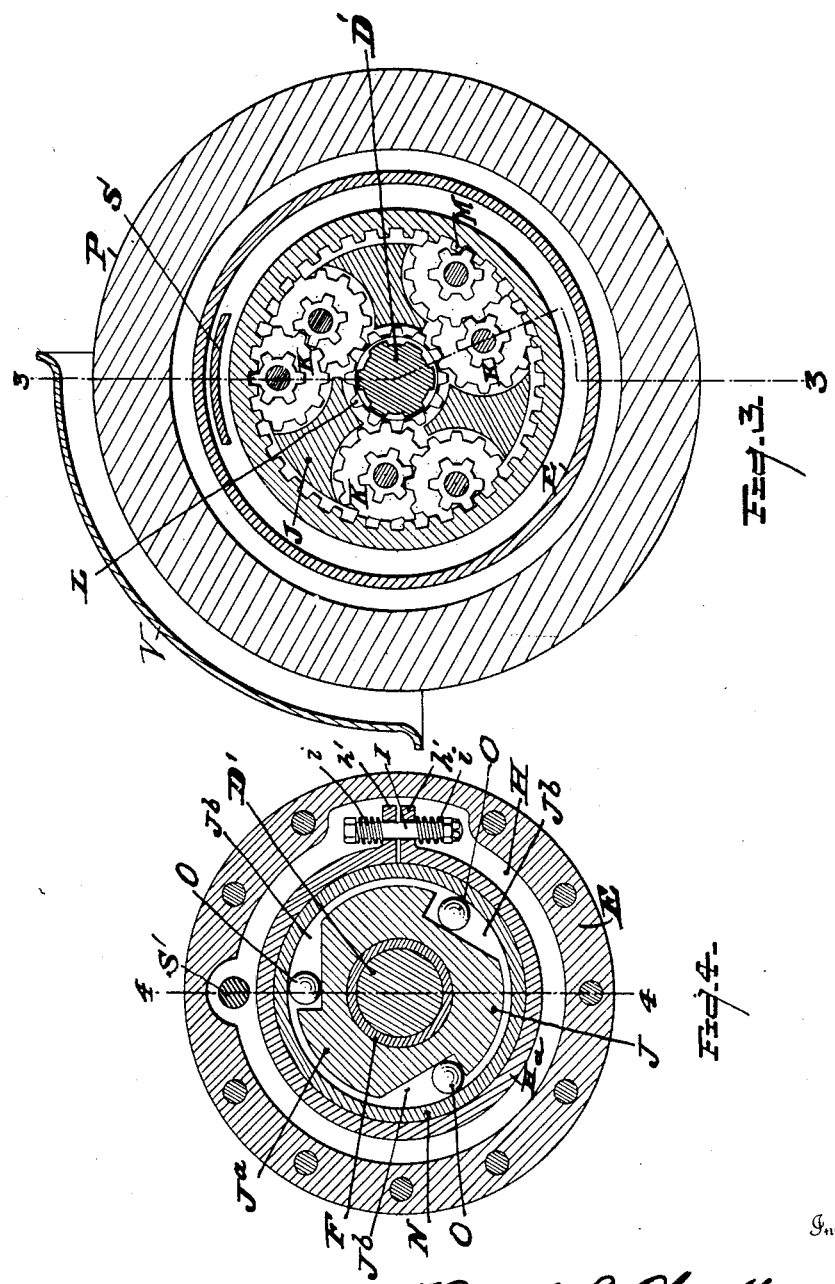
Inventor
Ralph B. Otwell
By S. E. Thomas
Attorney Patented Sept. 3, 1929.

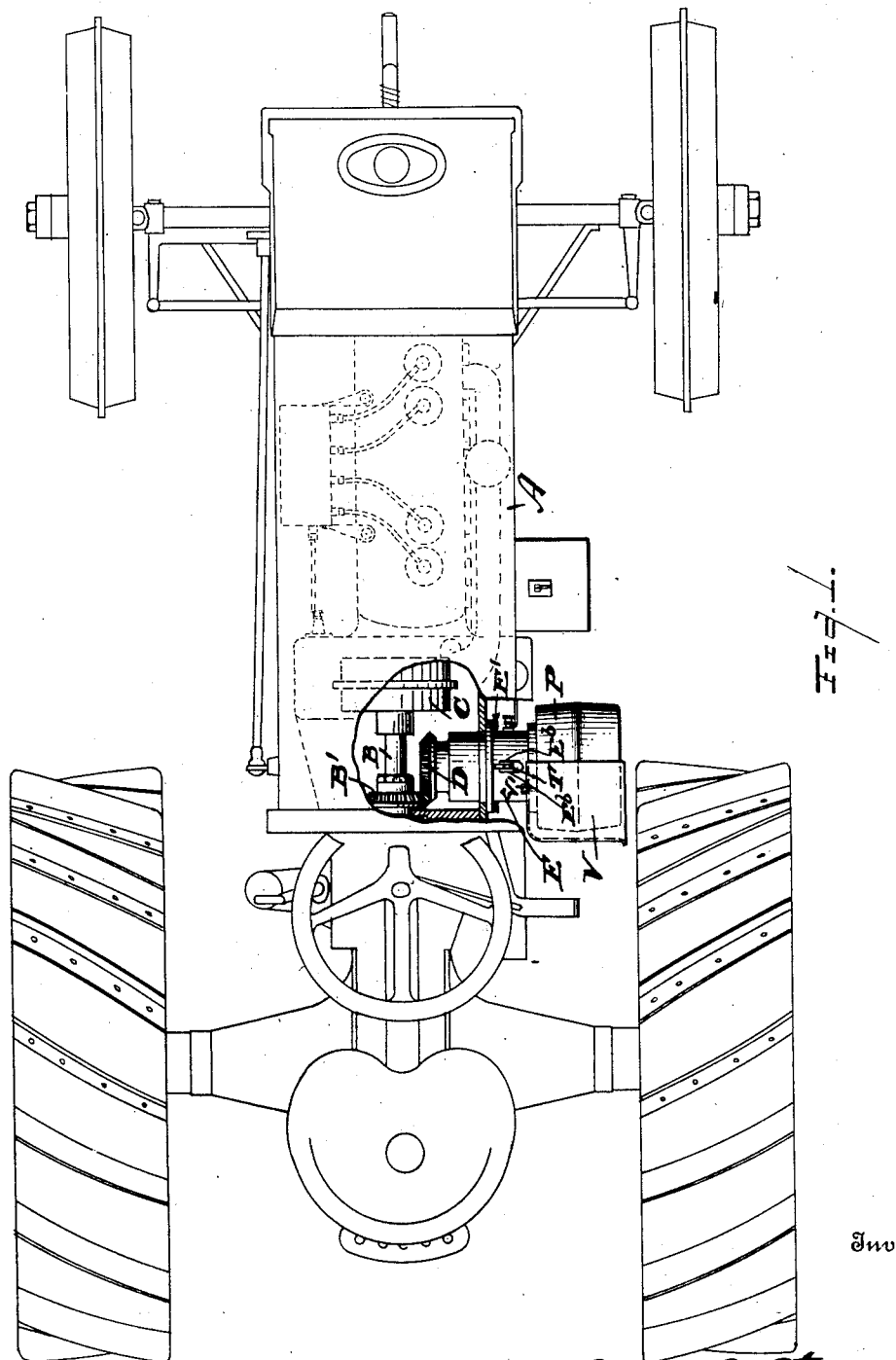

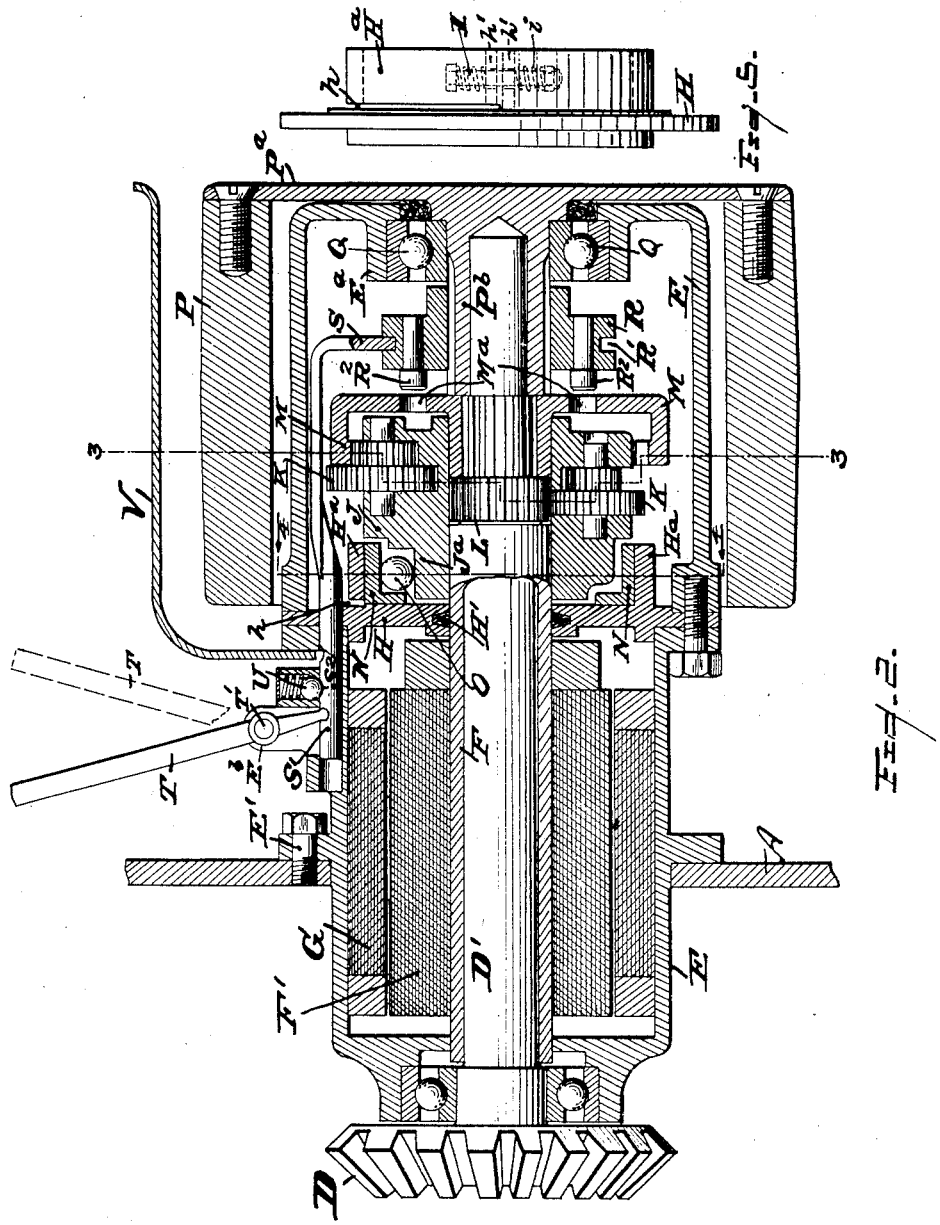

1,726,760

UNITED STATES PATENT OFFICE.

RALPH B. OTWELL, OF REDFORD, MICHIGAN.

COMBINED MOTOR-GENERATOR STARTING UNIT FOR TRACTORS.

Application filed March 7, 1928. Serial No. 259,888.

My invention relates to an electric starter-generator unit for tractors combined with its power take-off shaft,—the object being to supply a compact and rugged construction adapted to occupy relatively small space and easily accessible, and to that end is enclosed within a divided housing bolted to the frame of the tractor and extending into the pulley of the power take-off shaft, journalled therein,—thus providing a unitary device which may be readily installed or removed from a well-known tractor without change or alteration of the latter for its accommodation.

The invention further consists in the employment of a planetary reduction gear mechanism located adjacent the end of the power take-off shaft, operably connecting the latter with the armature shaft of the motor-generator, whereby a relatively large torque may be obtained to start the engine,—means being provided to release the planetary gear mechanism upon the engine operating under its own power,—the planetary gear mechanism thereupon ceasing to function as a speed reduction mechanism that the starter may be actuated at engine speed, thus converting the motor into a generator to charge a battery for actuating the starter mechanism.

Another feature of the invention consists in a manually operated slidable clutch mechanism adapted to couple or release the pulley of the power take-off shaft with the annular gear of the planetary gear mechanism, and thereby with the power take-off shaft.

With the foregoing and other objects in view which will appear as the description proceeds, the invention further resides in the combination and arrangement of parts and in the details of construction hereinafter described and claimed, it being understood that changes may be made in the precise embodiment of the invention herein shown and described without departing from the spirit of the same.

In the drawings accompanying this specification:

Figure 1 is a phantom plan view of a tractor with parts broken away showing the power take-off shaft geared to the transmission shaft of the engine.

Figure 2 is a longitudinal sectional view—taken on or about line 3—3 of Figure 3,—see also line 4—4 of Figure 4—through the divided housing and pulley of the power take-off shaft, showing a motor-generator within the housing, with a planetary reducing gear mechanism coupling the power take-off shaft with the motor-generator for starting the engine and charging a battery,—also means for manually coupling the pulley to and releasing it from the power take-off shaft,—the pulley being shown in released relation.

Figure 3 is a cross-sectional view of the pulley, power take-off shaft, and housing,—taken on or about line 3—3 of Figure 2.

Figure 4 is a cross-sectional view of the power take-off shaft, armature shaft, clutch member, and housing,—taken on or about line 4—4 of Figure 2.

Figure 5 is a side elevation of the partition wall dividing the housing surrounding the power take-off shaft into two compartments, showing its integral projecting collar slotted to partially divide it from the partition wall to provide a yieldable drag or brake.

Referring now to the letters of reference placed upon the drawings:

A denotes a well-known type of tractor. B indicates the transmission drive shaft of the tractor and $B^1$ a bevel gear on the drive shaft. C denotes the usual clutch assembly on the transmission shaft. D designates a bevel gear mounted on a power take-off shaft $D^1$ in mesh with the gear $B^1$ on the transmission drive shaft of the engine.

E is a divided annular housing, bolted at $E^1$ to the tractor wall, enclosing the power take-off shaft D extending loosely through an annular armature shaft F carrying the armature $F^1$ of a motor-generator G, supported in one of two compartments formed by a partition wall H bolted between opposing flanges of the divided housing.

The partition wall H is provided with a central bore through which the power take-off shaft and one end of the armature shaft projects. $H^1$ is a suitable packing ring lodged in a groove formed in the partition wall to provide against leakage of oil into the motor-generator chamber.

The partition wall has also an integral projecting annular collar $H^a$ which is partially divided from the wall proper—see (h) Figure 5—to provide a yieldable portion having outwardly projecting flanges $h^1$, $h^1$—see Figure 4—to receive a bolt I on which are sleeved springs $i$, $i$, bearing against the head and nut of the bolt and the respective flanges to contract the yieldable portion of the collar.

J denotes a fitting loosely mounted upon the annular armature shaft in which is journalled a plurality of trains of stepped speed reduction gears K in mesh with a gear L on the armature shaft and a ring gear M keyed to the power take-off shaft. The fitting J on the side adjacent the partition wall is constructed with a clutching member $J^a$ adapted to be locked to a ring N preferably L-shaped in cross-section lodged within the yieldable annular collar $H^a$ of the partition wall.

The clutching portion $J^a$ of the fitting J consists of a plurality of wedge-shaped peripheral pockets $J^b$ in each of which is lodged a ball O adapted to lock the fitting J and ring N together when positioned in the contracted portion of the pockets,—the fitting being released however from the ring upon the balls entering the enlarged end of the pockets.

P is an annular pulley secured to a disc $P^a$ provided with an inwardly extending hub $P^b$, loosely sleeved upon the outer end of the power take-off shaft. Q is a ball bearing for the hub of the pulley supported within the rim $E^a$ of the divided housing.

R is a longitudinally slidable collar splined or keyed to the hub $P^b$ of the pulley, provided with a peripheral groove $R^1$, to receive the inwardly projecting arm S of a shifting bar $S^1$, adapted to be manually actuated by a lever T pivoted at $T^1$ between spaced lugs $E^b$ extending outwardly from the wall of the housing.

U is a spring actuated detent adapted to enter a plurality of notches $S^2$ formed in the bar S to yieldingly hold it when adjusted through the operation of the lever T. $R^2$ are pins projecting from the face of the collar R designed to enter apertures $M^a$ in the wall of the ring gear M to lock the pulley to the revolving ring gear when it is desired to drive the pulley.

V is a guard for the pulley P bolted at $V^1$ to a flange of the divided sleeve. The guard V forms a convenient foot-rest for the driver when seated and driving the tractor.

Having indicated the parts by reference letters, the construction and operation of the device will be readily understood.

The wiring and ignition system of automotive vehicles being generally known and well understood, it will be unnecessary to go into a detailed description of the same in connection with the present device.

When it is desired to start the engine, a switch—not shown—is thrown to pass the current from a storage battery to the motor-generator G, causing the rotation of the armature shaft F, which is driven in a clockwise direction.

Mounted upon the armature shaft and integral therewith is a gear L in mesh with a train of gears K which upon starting to rotate tend to move the fitting J in a counter-clockwise direction within the ring gear M. The movement of the fitting J in a counter-clockwise direction is however promptly arrested by the binding action of the balls O upon the ring N and lower wall of the wedge-shaped pockets of the clutch portion of the member J, as will be readily understood upon reference to Figure 4 of the drawings.

The fixation of the fitting J causes gear L to drive through the train of gears K the ring gear M, keyed to the power take-off shaft D in a clockwise direction, thus rotating the transmission shaft to start the engine.

Upon the engine starting, the increased speed of rotation of the shaft $D^1$ in a clockwise direction tends to drive the train of gears and their fitting J in a counter-clockwise direction about the gear L. The movement of the fitting J in a counter-clockwise direction serves to release the balls O from their locking relation permitting the fitting J to rotate freely about the power take-off shaft $D^1$. The ring gear M and fitting J thereupon rotate together and as a unit with the armature shaft F, the gear train serving now to lock the ring gear M to the armature shaft, thus converting the starting motor into a generator to charge a battery—not shown—for energizing the starting motor.

The annular yieldable and compressible collar $H^a$ of the partition wall H serves to maintain a yieldable dragging connection between the ring N and the partition wall. This connection permits of a slight slippage of the ring N necessary to relieve undue strain on gear teeth caused by a sudden seizure of the balls O in starting the engine.

But while I prefer to employ the device just described, it may be dispensed with, dependence being placed upon the usual clutch assembly C on the transmission shaft to afford the required relief against stripping of gears or other damage resulting from starting or "back-firing" of the engine.

Having thus described my invention what I claim is:

1. In combination with a tractor, an engine, its drive shaft and a gear carried thereby, a device of the character described comprising a housing bolted to the tractor; a power take-off shaft journalled within the housing; a gear fitted to said last named shaft in mesh with the gear of the drive shaft; an electric motor-generator disposed within the housing provided with an annular armature shaft sleeved upon the power take-off shaft; a gear fixed to the armature shaft; a ring gear fixed to the power take-off shaft; a train of planetary gears in mesh with the ring gear and the gear fixed to the armature shaft; means sleeved upon the armature shaft for supporting said planetary gears; and a suitable clutch mechanism adapted to arrest rotative movement of said means, whereby the planetary gears may operate to effect a speed reduction between the armature shaft and the power take-off shaft for starting the traction engine, and to automatically release said means upon the engine operating at a relatively greater speed under its own power, whereby the motor may function as a generator to charge a battery.

2. A structure as specified in claim 1 in combination with a belt pulley sleeved upon the end of the power take-off shaft; means for clutching said pulley to the power take-off shaft; and means for manually operating said clutching means.

3. A structure as specified in claim 1 in combination with a belt pulley open on one side to receive the end of said housing within the pulley; a disc bolted to the outer edge of the pulley provided with a hub portion loosely sleeved upon the end of the power take-off shaft; a bearing disposed within the housing for the pulley; a slidable collar splined upon the hub of the pulley, having means adapted to interlock with the ring gear; and means for manually shifting said collar to interlock with the ring gear to secure the operation, or release of said pulley.

4. A structure as specified in claim 1 in combination with a belt pulley sleeved upon the end of the power take-off shaft; means for clutching said pulley to the power take-off shaft; means for manually operating said clutching means; and a combined guard and foot-rest partially enclosing said pulley bolted to the wall of the housing.

5. In combination with a tractor, an engine, its drive shaft and gear carried thereby; a device of the character described comprising a divided housing bolted to the tractor; a power-take off shaft; a gear fitted to said last named shaft in mesh with the gear of the drive shaft; an electric motor-generator disposed within the housing provided with an annular armature shaft sleeved upon the power take-off shaft; a gear fixed to the armature shaft; a ring gear fixed to the power take-off shaft; a train of planetary gears in mesh with the ring gear and the gear fixed to the armature shaft; a partition wall dividing the housing into two compartments in which are respectively disposed the motor-generator and the planetary gear mechanism, said partition wall provided with an integral projecting collar partially divided from the wall and with outstanding ends adapted to be drawn together to compress the collar; a ring sleeved within the collar; a bolt extending through the ends of the collar; springs sleeved upon the bolt adapted to contract the collar upon the ring to provide a yieldable drag upon the latter; means sleeved upon the armature shaft adapted to receive and support the planetary gears, having a plurality of wedge-shaped peripheral pockets; balls lodged in the respective pockets co-operating with the ring within the collar of the partition wall to form a clutch mechanism, whereby the planetary gears may be operated to effect a speed reduction between the armature shaft and the power take-off shaft for starting the traction engine, the clutch mechanism being automatically released upon the engine operating at a relatively greater speed under its own power, whereupon the motor functions as a generator to charge a battery.

6. In combination with a tractor, an engine, including its transmission drive shaft, bevel gear, and clutch, a device of the character described comprising a divided housing bolted to the tractor wall; a power take-off shaft journalled within the housing; a gear fitted to said last named shaft in mesh with the gear of the transmission drive shaft; an electric motor-generator disposed within the housing provided with an armature shaft sleeved upon the power take-off shaft; a gear fixed to the armature shaft; a ring gear fixed to the power take-off shaft; a train of planetary gears in mesh with the ring gear and the gear fixed to the armature shaft; and means sleeved upon the armature shaft for supporting said planetary gears, including a clutch mechanism adapted to automatically arrest the rotation of said means, whereby the planetary gears may operate to effect a speed reduction between the armature shaft and the power take-off shaft when starting the traction engine from a battery, and to automatically release said means upon the engine operating under its own power at a relatively greater speed,—the motor then functioning as a generator to charge a battery.

7. A structure as specified in claim 1 in combination with a belt pulley open on one side to receive the end of said housing within the pulley; a disc bolted to the outer edge of the pulley provided with a hub portion loosely sleeved upon the end of the power take-off shaft; a bearing disposed within the housing for the pulley; a slidable collar splined upon the hub of the pulley, having projecting pins adapted to enter corresponding holes in the wall of the ring gear; and means for manually shifting said collar that it may interlock or be released from the ring gear to obtain either the operation or the release of said pulley.

In testimony whereof, I sign this specification.

RALPH B. OTWELL.